United States Patent [19]
Edberg

[11] 3,912,840
[45] Oct. 14, 1975

[54] MICROPOROUS SHEET HAVING SUEDE-LIKE SURFACE AND METHOD OF MAKING

[75] Inventor: Ralph C. Edberg, Mounds View, Minn.

[73] Assignee: Minnesota Mining and Manufacturing Company, St. Paul, Minn.

[22] Filed: Oct. 15, 1974

[21] Appl. No.: 514,808

[52] U.S. Cl. .................... 428/85; 156/77; 427/205; 428/305; 428/904
[51] Int. Cl.² ........................................... B32B 3/26
[58] Field of Search ................. 161/159, DIG. 2, 62; 156/77; 117/16, 19, 29

[56] References Cited
UNITED STATES PATENTS

| 3,709,774 | 1/1973 | Kimura | 161/DIG. 2 |
| 3,718,532 | 2/1973 | Hayes, Jr. | 161/DIG. 2 |
| 3,764,363 | 10/1973 | Civardi et al. | 161/DIG. 2 |

Primary Examiner—William J. Van Balen
Attorney, Agent, or Firm—Alexander, Sell, Steldt & DeLaHunt

[57] ABSTRACT

Microporous polymeric sheets having a suede-like surface are disclosed. The microporous sheets comprise a first microporous portion and a second macroporous portion overlying and chemically integral with the first portion. The second macroporous portion contains micropores and in addition at least 50% of its volume comprises randomly oriented macrovoids distributed throughout. A sufficient number of the voids are in open communication with the surface of the polymer sheet to provide a suede-like surface. The sheet may be adhered to a supporting substrate to improve body and toughness. The sheets are prepared by immobilizing a polymeric solvent coating and removing the solvent and removable particulate filler and/or surface particles therefrom to form a microporous suede-like sheet.

16 Claims, No Drawings

MICROPOROUS SHEET HAVING SUEDE-LIKE SURFACE AND METHOD OF MAKING

The present invention relates to microporous, polymeric sheets having a suede-like finish similar to that of high quality natural suede which sheets are useful as leather substitutes in the manufacture of footwear and clothing as well as for polishing and buffing media and the like.

The present invention also relates to a simplified method of providing a suede-like, microporous, polymeric sheet which method comprises coating a supporting substrate with a coating composition comprising a polymer solution which may optionally contain a removable, particulate filler; applying a removable particulate material to the surface of the polymer coating; immobilizing the polymer coating, such as by evaporating the polymer solvent or by contacting the coated substrate with liquid or vapor to coagulate the polymer; and removing the polymer solvent and removable solid particles from the interior and the surface of the coating. The resulting sheet is a microporous, polymeric sheet having a suede-like surface which surface is provided without the need for mechanical buffing or abrading.

Polymeric leather-like sheets having a sueded surface are known in the art. These products have generally been prepared by impregnating a fibrous bat with a polymeric impregnant to form a supple sheet. After buffing or abrading to raise the nap the products resemble natural suede. See, for example, U.S. Pat. Nos. 3,067,482, 3,067,483, 3,578,481, 3,597,256, 3,600,209. It has also been known to provide a cellular polyurethane sheet by contacting a cast polyurethane solution with a leaching liquid to coagulate the film and leach the solvent from the film to form a cellular film. The surface of the film is then abraded to expose a portion of the cells and create a suede-like surface. Sheet materials prepared by this method are disclosed in U.S. Pat. Nos. 3,284,274 and 3,524,791. More specifically, these patents disclose sheet materials comprising a microporous polymeric material, such as a microporous polyurethane, which include a coarse-pore, cellular layer of polymeric material having about 75 to 100% of its volume composed of contiguous elongated cells perpendicularly oriented in relation to the plane of the surface of the sheet, which sheets can be abraded to produce a nap thereon. These sheets are suitable as leather substitutes in the manufacture of footwear.

Polymeric sheets having suede-like surfaces have also been prepared by applying a water soluble particulate material such as salt to the surface of a polyvinyl chloride or other "plastic" material so that the salt particles sink down into the surface of the polymer or penetrate completely throughout the polymeric layer. Subsequent leaching of these particles with water provides a polymeric sheet which in one case has craters on the surface of the sheet which resemble a suede-like surface (U.S. Pat. No. 2,837,440), and in the other case leaching of the salt particles provides continuous columns extending through the entire thickness of the polymeric sheet, thereby forming a gas permeable, artificial suede-like leather (U.S. Pat. No. 2,983,960).

It has also been known to prepare microporous polyurethane sheets by incorporating a leachable solid filler into a solution of the polyurethane polymer, coating the polymer on a substrate, evaporating the solvent to immobilize the polymer coating and thereafter leaching out the removable filler with a solvent for the filler. Variations of this procedure are disclosed in U.S. Pat. Nos. 3,496,000 and 3,524,753.

Thus it can be seen that the microporous, suede-like, polymeric sheets which are disclosed or suggested by the prior art require buffing of the sheets to produce a microporous sheet having a suede-like surface. This step of buffing or mechanically abrading the sheet represents an extra processing step and tends to decrease the durability of the finished product. The suede-like materials disclosed in the art which do not require buffing are not microporous.

According to the present invention, there is provided a microporous, polymeric sheet material having a suede-like surface and a method for making a microporous, suede-like material without the need for buffing the surface of the material. One aspect of the invention relates to a microporous, polymeric sheet having a suede-like surface which comprises a first microporous portion and a second macroporous portion overlying and chemically integral with the first microporous portion. The second macroporous portion contains micropores and in addition at least 50 percent of its volume comprises randomly oriented macrovoids distributed throughout the second portion. The randomly oriented macrovoids have an average void volume of about $7 \times 10^{-8}$ to about $6.5 \times 10^{-5}$ cm$^3$ and a sufficient number of the voids are in open communication with the surface of the polymer sheet to provide a suede-like surface.

Another aspect of the invention relates to a suede-like sheet wherein the microporous portion of the above-described sheet material is in adherent contact with one major surface of a substrate, preferably a porous, flexible, substrate such as a fibrous non-woven web.

A further aspect of the invention relates to a method of making the suede-like sheets of this invention which method comprises the steps of (a) applying to a substrate a coating composition comprising a polymer solution which may optionally contain a particulate, removable filler having a particle size sufficiently small to create micropores when subsequently removed, e.g. having a particle size less than about 50 microns; (b) completely covering the polymer coating with a layer of removable particles having an average particle volume of about $7 \times 10^{-8}$ to $6.5 \times 10^{-5}$ cm$^3$; (c) immobilizing the polymer coating and removing the solvent from the coating; (d) removing the removable particles from the surface and interior of the coating; and (e) drying the resulting microporous, suede-like sheet as necessary.

The polymer solutions used in the coating compositions of the present invention preferably comprise solutions of elastomeric polyurethane polymers in solvent. The polymer solutions can include minor amounts, based on the weight of polymer solids, of other compatible, soluble polymers, such as polyvinyl chloride polymers, as will be described in greater detail hereinafter.

As used herein the term "microporous" refers to voids which are not discernible by the naked eye, e.g. voids which are generally less than about 50 microns in diameter, but which still allow the passage of moisture vapor. Such microporosity is advantageous in the use of the suede-like sheets for the manufacture of footwear. The macrovoids in the macroporous upper portion of the suede-like sheet average at least about $7 \times 10^{-8}$ to $6.5 \times 10^{-5}$ cm$^3$ in volume so as to be visible to the naked eye and provide a pleasing, suede-like surface. These macrovoids can be regular or irregular in shape and generally approximate the shape of the removable particles which are used to form them. When the voids are not isometric they are randomly oriented with respect to the surface of the sheet. Thus, those voids communicating with the surface of the sheet present either the long or short dimension to the viewer. When a surface resembling natural suede is desired, the voids are preferably isometric in shape, e.g. cubic or spheroidal. Pleasing effects can also be obtained with voids which are somewhat elongated such as oblate, elliptical, oval or polyhedral voids, and can be controlled by selection of the removable particles applied to the surface of the coating as will be described hereinafter.

The microporous, suede-like sheets produced according to the present invention are vapor permeable sheets having a suede-like finish similar to that of natural suede and can be used as leather substitutes in the manufacture of footwear and clothing as well as for polishing media and the like. The present process provides a method for obtaining a natural suede finish, while eliminating the need for abrading the surface of a coarse celled sheet to expose the cell walls adjacent the surface of the sheet, as is widely practiced in the prior art. In addition, the process of the present invention provides means for varying the nature of the surface nap of the suede-like sheet by controlling the nature of the particulate material used to provide the surface effect.

The suede-like sheets of the invention can comprise a polymeric sheet having a suede-like surface adhered to a substrate as described above. The substrates to which the polymeric sheets are usefully adhered can be any flexible substrate and is preferably a porous substrate. Particularly preferred are porous, fibrous webs or batts which can be woven or non-woven. The fibers can be natural or synthetic materials generally known in the art. Synthetic fibers derived from organic polymers such as polyamides, polyesters, polyolefins, vinyl polymers, and the like are preferred. The webs or batts can be needle punched, shrunken and pressed to provide a dense, fibrous structure which can be coated with the polymeric coating compositions of the invention. The density of the fibrous substrates will vary depending upon the construction and chemical composition of the substrate. The fibrous substrates should be open enough to be porous, but should be tight enough to retain the coating compositions without complete penetration of the coating liquid. The integrity and strength of the substrate must be balanced with the overall stiffness and appearance of the final product as will be obvious to a skilled worker in the art from the disclosure herein. A particularly preferred substrate is a Rando-Web prepared from 100 percent polypropylene fibers which web has been densified with needle-looming, heat shrinking and pressing to a density of between about 0.2 to 0.3 grams/cm$^3$, preferably about 0.25 grams/cm$^3$.

When the substrates noted herein are used only for the purpose of supporting the suede-like sheet during casting, the substrate need not be porous or flexible. Generally a substrate which will release the immobilized coating is used such as a silicone coated liner paper, smooth glass, or the like.

The polymers useful in preparing the suede-like sheets of the present invention comprise elastomeric polyurethane polymers and polyurethane polymers in combination with minor amounts (based on the total weight of polymer solids) of other compatible polymers, such as the vinyl chloride polymers, preferably polymers which are soluble in the same solvents as the polyurethane polymers. Minor amounts of plasticizers, fillers, dyes, pigments and the like can be used with the polymers to enhance or alter the physical or esthetic properties of the sheets consistent with the invention.

As used herein "polyurethane" includes polyurethane polymers as well as polyurethane-polyurea polymers and polyurea polymers. The polyurethane polymers are preferably polyether or polyester polyurethane elastomeric polymers and can be prepared using methods and materials known in the art. U.S. Pat. No. 3,100,721, particularly at columns 3–6, discloses various polymers mentioned herein which are useful in the practice of the invention, which disclosure is incorporated herein by reference. Additional disclosure of polyurethanes useful in the preparation of microporous synthetic leather sheets can be found in U.S. Pat. Nos. 3,000,757, 3,496,000, 3,524,753, and 3,594,220.

In preparing the suede-like sheets of the present invention, a polymeric coating composition is applied to the surface of a substrate. The polymer sheet is preferably formed on and adhered to a substrate as will be described in greater detail hereinafter. However, the present invention also comtemplates the formation of the microporous, polymeric sheet on supporting substrates such as a release liner or the like wherein the sheet is removed from the substrate for use as a self-supporting, "free" polymer sheet. Alternatively, the free sheet can be bonded to a supporting substrate by separate adhesive means, thermal bonding of the polymer sheet to the substrate or the like.

When the sheet is to be formed on and adhered to a substrate it may be desirable to prime the substrate to promote adhesion to the substrate and/or stiffen or "tighten" the substrate and resulting composite sheet. If it is desired to prime the substrate, a low viscosity solution of one or more polymers in a solvent is used. Preferably the solvent is the same solvent used in the polymer coating solution and described hereinafter, and preferably is a solvent which is miscible with liquids which are not solvents for the polymer, e.g. miscible with water, so that the solvent can be leached from the coating with liquid. Priming is generally used with the fibrous substrates such as the Rando-Web substrates. The viscosity of the primer is selected so that the primer will penetrate into, but not through, the substrate.

The polymers preferred for use in the primer compositions comprise elastomeric polyurethane polymers alone or in admixture with other compatible polymers which are soluble in the same solvents as the polyurethane polymers. These polymers are the same polymers useful in the polymer coating solution described herein. A particularly useful primer composition comprises a blend of a polyester polyurethane polymer and a polyvinyl chloride polymer in about equal parts by weight, the blend being dissolved in a water miscible solvent such as DMF. This solution, having a viscosity of about 1,900 centipoise, will penetrate into but not through a non woven, e.g. Rando-Web, polypropylene substrate having a density of about 0.25 g/cm$^3$. The primer provides a "tighter" product having greater body and enhanced shoemaking properties.

The polymer coating compositions used in the present invention are prepared by dissolving a polymer, preferably a polyurethane polymer, in a removable solvent, preferably a water miscible organic solvent which can be leached from the polymer solution by a liquid which is a non-solvent for the polymer. N,N-dimethylformamide (DMF), dimethyl sulfoxide, tetrahydrofuran and mixtures thereof are suitable. Especially preferred are solvents comprising DMF since they meet the above requirements with a wide variety of polymers. If the solvent is to be removed by evaporation, the solvent should be one which has a boiling point temperature below that at which the polymer is degraded. Higher boiling solvents can be used and removed under conditions of reduced pressure, but may be less desirable for economic reasons.

As noted previously, a removable particulate filler having a particle size sufficiently small to provide microporosity when removed, generally less than about 50 micron particle size, can be incorporated in the coating solution before it is applied to the substrate. Although a microporous coating can be obtained merely by removal of the polymer solvent, incorporation of the removable filler particles provides the potential for conveniently creating microporous sheets having a five-fold increase in moisture vapor transmission (MVT) over sheets made by solvent removal alone. The increased MVT properties or "breathability" are particularly desirable when the microporous sheets are to be used as a substitute for suede leather in the manufacture of footwear.

The removable, particulate fillers used in the coating composition comprise particles less than about 50 microns. Preferably the particles are between 1 and 30 microns to produce micropores, i.e., pores not discernible to the naked eye, in the finished product and most preferably the particulate filler has an average particle size of about 5 microns.

The fillers should be particles which are not soluble in the polymer solvent used in the coating composition. The preferred fillers are those fillers which are water soluble or leachable in aqueous media. Finely divided inorganic salts such as the sulfate or chloride salts of potassium or sodium are preferred. Sodium chloride is fully operative in this invention and has obvious economic advantages, but any removable, particulate filler is suitable which remains solid and does not degrade or enter into side reactions with the polyurethane under the processing conditions used in the present invention.

The filler particles are generally present in amounts of about 1 to 3 parts by weight of filler particles per part of polymer solids, preferably about 2 parts by weight per part polymer solids. The amount can be varied depending on the degree of microporosity desired.

The viscosity of the polymer coating composition should be sufficiently low to facilitate coating by conventional means, such as knife coating, and will usually be below about 200,000 centipoise. The lower limit for viscosity will depend on the coating method, the coating thickness desired, the density of the filler particles dispersed in the polymer solution, and the nature of the suede surface desired. Normally, the viscosity should be at least about 30,000 centipoise to prevent the solution from penetrating the substrate excessively if a porous web is used and to maintain the filler particles uniformly dispersed in the solution without excessive stratification.

Conventional coating methods for viscous solutions such as knife coating are well suited to this invention. The thickness of the coating applied to the substrate must be at least as great as the desired suede nap depth and normally a heavier coating is preferred to enhance the appearance and "hand" of the product. When a knife coater is used it has been found desirable to set the coater orifice about 30 – 60 mils (0.75 – 1.5 mm) above the web to obtain a satisfactory coating thickness.

After the substrate has been coated with the polymer coating composition the polymer coating is completely covered with a layer of removable particles having an average volume of about $7 \times 10^{-8}$ to $6.5 \times 10^{-5}$ cm$^3$. The particles can be applied to the surface by shaking, dusting or other means which does not adversely disturb the polymer surface. The polymer coating must be completely covered with the particles in order to obtain a satisfactory suede effect after they are removed, and the particles must be allowed to sink or penetrate partially into the coating to get the necessary depth to the suede-like surface. However, the particles should not be allowed to penetrate completely through and become sealed in the coating. The desired degree of penetration can vary widely depending on the product application, but can readily be regulated by controlling such variables as the viscosity of the topcoat composition, the density of the particulate material applied, the dwell time of the particles before coagulation of the polymer film, the amount of excess particles applied to the surface, and the like.

The polymer coating must be completely covered with particles prior to immobilization of the coating. Thus, if some of the particles sink into the polymer coating after being spread onto the surface, other particles must be added to that portion of the surface vacated by the sunken particle so that a uniform suede surface will be formed. Adequate coverage of the polymer coating with the particles is insured by applying an excess of the particles. Generally for polymer coating compositions having a viscosity within the range specified herein about one-third pound of salt per square foot (1.6 kg/m$^2$) provides a particle layer about one-sixteenth inch (0.16 cm) thick and completely covers the coating. The excess particles may be removed by leaching or dissolving the particles or by inverting, tilting, or shaking the web, blowing the particles away with an airstream, or otherwise physically removing the excess particles.

The particles used on the surface of the polymer coating are generally of the same chemical composition as those dispersed within the topcoating, or they may be different. The prime requirements are that the particles be solid and that the particles are not soluble in the solvents in which the polymer is dissolved. Preferably the particles should be soluble in liquids which are not solvents for the polymer used in the coating, e.g. water, so they can be removed by liquid leaching.

The average volume of the particles applied to the surface of the polymer coating is greater than the fine particles which are dispersed within the coating to create microporosity. The volume and shape of the particles applied to the surface are the single most important factors in determining the nature of the suede surface. Very small particles yield a very fine suede, and large particles yield a coarse suede. The configuration of the particles will have subtle effects on the appearance of the product, e.g. a cubic particle will yield a slightly different appearance than spheroidal, elongated, or plate-like particles of the same size. The density of the particulate material can be an important consideration if the viscosity of the coating composition is fixed by other factors such as the viscosity limitations inherent in a particular polymer/solvent combination, the amount of removable particulate filler in the polymer solution, and the like. The density will affect the degree of penetration into the coating, and penetration affects the surface appearance of the product. Generally the average particle volume will be between about $7 \times 10^{-8}$ cm$^3$ and about $6.5 \times 10^{-5}$ cm$^3$. Sodium chloride particles having an average particle size of about 100 microns (a volume of about $1 \times 10^{-6}$ cm$^3$) has been found particularly useful in providing a fine-textured suede surface resembling high quality natural suede.

When the polymer coating has been applied to the substrate and the removable particles applied to the surface of the coating, the polymer solution must be immobilized to set or "freeze" the polymer surface as deformed by the surface particles. The method of immobilizing the polymer will depend on the polymer system that has been selected. Generally it has been found satisfactory to immobilize the polymer by evaporation of the solvent or by coagulation of the polymer coating by the application of a liquid or vapor which is a non-solvent for the polymer, but which is miscible with the polymer solvent, and removal of the solvent by leaching. For example, a polyurethane solution in DMF solvent can be effectively coagulated with water and after leaching of the solvent will yeild a microporous sheet. When a water bath is used to coagulate the polymer, it is generally useful to heat the water slightly, for example up to about 50° to 60°C. to promote solubility of liquids and solids in the leaching liquid and reduce the dwell time of the polymer coating in the bath.

Simultaneous with, or subsequent to, the immobilization of the polymer coating, the particles are removed from the interior and the surface of the polymer coating to provide a microporous polymeric sheet having a suede-like surface. This can be most simply done by washing the coated substrate in a liquid which is not a solvent for the polymer, but which will dissolve the particles. If simultaneous coagulation of the polymer and leaching of the particles and solvent is desired, a liquid is used which is miscible with the polymer solvent and which will also dissolve the particulate filler and surface particles. Thus, the coagulating and leaching steps can be conveniently combined. In the case of a solution of polyurethane polymer and sodium chloride particles in DMF solvent, this can be readily accomplished by exposing the coated substrate to a water bath. Since water is not a solvent for the polyurethane polymer, but is miscible with the DMF solvent and will dissolve the sodium chloride particles, the water bath will coagulate the polymer coating and leach the solvent and filler particles from the coating to provide a microporous sheet having a suede-like surface caused by the removal of the soluble particles. Other means of removing the surface particles, such as by abrading, buffing, beating or application of vacuum or other mechanical means, can also be used, but are less desirable than removal by leaching since the mechanical techniques, particularly abrading, can be detrimental to the physical properties of the sheet.

After removal of the particles and the polymer solvent, the sheets can be dried if desired to remove residual liquids as may be required for further processing. If further treating or wet processing steps are contemplated the sheet may not require drying. The sheets can be satisfactorily dried in an air circulating oven or by other heat sources to remove moisture. Temperatures below those at which the polymer will degrade or flow should be used. Generally temperatures below about 125°C. are satisfactory.

The following examples will illustrate the practice of the present invention. Parts are expressed by weight unless otherwise indicated.

EXAMPLE 1

A microporous, polyurethane, suede-like sheet was prepared in the following manner. A coating composition was compounded in a reaction kettle by combining the following ingredients:

| Topcoat Composition | Pts/Wt. |
|---|---|
| Polyester polyurethane ("ESTANE" 5707-F-1, B. F. Goodrich | 100 |
| Dimethyl Formamide | 278 |
| Black pigment concentrate ("16-BK-4", Wilson Chemical Co.) | 3 |
| Sodium chloride powder (average particle size, 5 microns) | 177 |

Sodium chloride particles were prepared by grinding 300 to 400 micron sized particles to provide an average particle size of about 5 microns. A minor amount of calcium stearate was added during grinding to prevent caking of the salt. The ingredients shown above were combined in a reaction kettle and stirred until the polyurethane was completely dissolved in the solvent and the sodium chloride and pigment were thoroughly dispersed in the mixture. During blending the temperature was maintained below 43°C. When mixing was complete, a vacuum was applied to the vessel to remove air entrained during mixing. The resulting composition was found to have a viscosity of approximately 100,000 centipoise at room temperature (24°C.).

A Rando-Web substrate prepared from 100% polypropylene fiber which had been densified with needle looming and heat shrinking to a density of about 0.25 g/cm$^3$ was prepared. A portion of the coating composition was coated onto the Rando-Web substrate using a knife coater and a gap of 70 mils (1.8 mm) between the web and the knife. Immediately after coating, a layer of salt particles with an average particle size of about 100 microns (average volume about $1 \times 10^{-6}$ cm$^3$) was applied to the polyurethane polymer surface by hand shaking the salt particles through a U.S. Standard No. 50 sieve. The salt was applied until there was no evidence of the black coating visible through the salt layer. The sample was allowed to set undisturbed for approximately 3 minutes after the salt was applied. The sample was then immersed in a circulating bath of tap water at 54°C. and allowed to remain for approximately 2 hours. During this period the polymer coating coagulated and all of the salt was dissolved from the surface and from the interior of the coating. The DMF solvent was also completely removed during this immersion period.

The sheet was then dried in an air circulating oven at 120°C. for about 3–5 minutes, and the resulting material was found to have a suede-like surface that was very appealing to the eye and touch.

Microscopic examination of a cross-section of the sheet showed that the body of the polyurethane coating had a microporous structure, but that the surface portion had a much more open structure with fine tentacles of polymer extending upward. The spaces between these polymer extensions resembled the shape of a cube.

The degree of moisture vapor transmission (MVT) of the sheets was determined by sealing a cup containing water with the suede sheet and placing the sealed cup in a 50% relative humidity environment at about 22°C. After conditioning for about 2 hours the cup was weighed initially and weighed again after about 12 hours to determine the water loss. The MVT was calculated as grams of water transmitted per 100 square meters of suede-like sheet per hour. The suede-like sheet prepared in this example showed an MVT value of about 4,200 g/100 m²/hr.

EXAMPLE 2

A suede-like sheet was prepared in the same manner as described in Example 1, except that the coating was applied to a polyester film substrate in place of the Rando-Web substrate. After the process was complete and the coating was dried, the coating was removed from the substrate to provide a "free" suede-like sheet. The MVT rate of the sheet determined as in Example 1 was found to be about 4,850 g/100 m²/hr. The sheet had the same suede-like surface characteristics as the surface of the sheet prepared in Example 1, but did not have the strength and tear resistance of the sheet-substrate combination prepared in Example 1.

EXAMPLE 3

A microporous, polyurethane sheet having a suede-like surface was prepared as in Example 2, using a polymer coating composition without filler particles and having the following formulation:

|  | Parts/Wt. |
| --- | --- |
| Polyester polyurethane ("ESTANE" 5707, B. F. Goodrich) | 300 |
| Dimethyl formamide | 600 |
| Black pigment concentrate ("16-BK-$", Wilson Chemical Co.) | 100 |

The coating composition had a viscosity of approximately 150,000 centipoise. The resulting sheet was extremely dense and tough and had a very fine suede-like surface. The sheet was found to have an MVT value of about 750 g/100 m²/hr. when tested as in Example 1.

EXAMPLE 4

A microporous, suede-like sheet was prepared as in Example 1, except that the substrate web was primed before the particle-filled polyurethane coating solution was applied. The primer had the following composition:

|  | Parts/Weight |
| --- | --- |
| Polyester polyurethane ("ESTANE" 5707, B. F. Goodrich) | 5.4 |
| Polyvinyl chloride ("Geon" 427, B. F. Goodrich) | 5.4 |
| Anhydrous particulate colloidal silica ("Cabosil" M-5, Cabot Corp.) | 5.415 |
| Black dye ("TVY", Sandoz Chemical Co.) | 0.015 |
| N,N-Dimethylformamide | 83.77 |

Employing the Rando-Web substrate described in Example 1, a primer solution having a viscosity of about 1,900 cp was knife coated, using a 7–8 mil (0.18 – 0.2 mm) orifice, onto the substrate to provide a coating weight of about 0.07 – 0.085 lbs/ft² (0.03 – 0.04 g/cm²). The primer solution penetrated not more than about 50% of the thickness of the substrate web.

The primed web was then coated with a polyurethane coating and further processed as in Example 1. The resulting sheet was similar to that of Example 1, but has greater body and tightness. The MVT of the sheet was about 4,200 g/100 m²/hr when determined as in Example 1.

EXAMPLE 5

A microporous sheet was prepared as in Example 1 using surface particles having an average volume of about $1.6 \times 10^{-5}$ cm³. The resulting sheet was physically similar to Example 1, but had a medium-grained suede-like surface compared to the fine-textured surface of Example 1.

EXAMPLE 6

A microporous sheet was prepared as in Example 1 using surface particles having an average particle volume of about $6.4 \times 10^{-5}$ cm³. The resulting sheet was physically similar to Example 1, but had a coarse-grained suede-like surface compared to the fine-textured surface of Example 1.

The viscosity measurements on the coating compositions and primer solutions in the foregoing Examples were obtained using a Brookfield viscometer. The viscosity of the primer was measured using an RV No. 4 spindle at 20 rpm and room temperature. The viscosity of the coating compositions was measured using an RV No. 7 spindle at 10 rpm and room temperature.

What is claimed is:

1. A microporous polymeric sheet having a suede-like surface comprising a first microporous portion and a second macroporous portion overlying and chemically integral with said first microporous portion, said second macroporous portion containing microporous and additionally having at least 50% of its volume comprising randomly oriented macrovoids distributed throughout said second portion, said randomly oriented macrovoids having an average void volume of about $7 \times 10^{-8}$ to $6.5 \times 10^{-5}$ cm³, a sufficient number of said voids being in open communication with the surface of the sheet to provide a suede-like surface.

2. A sheet according to claim 1 wherein said first microporous portion is in adherent contact with a porous flexible substrate.

3. A sheet according to claim 2 wherein said porous flexible substrate is a non-woven web comprising polypropylene fibers.

4. A method of making a suede-like, polymeric sheet comprising the steps of
   a. applying a polymer coating composition to the surface of a substrate, said coating composition comprising a solution of elastomeric polyurethane polymer in solvent;
   b. depositing a sufficient number of removable particles on said polymer coating to form a layer completely covering said polymer coating, said particles having an average particle volume of about $7 \times 10^{-8}$ to $6.5 \times 10^{-5}$ cm$^3$;
   c. immobilizing the polymer coating and removing the solvent from the coating;
   d. removing particles from the polymer coating to provide voids in said coating; and
   e. drying the resulting suede-like sheet as necessary.

5. A method according to claim 4 wherein said polymer solution has dispersed therein removable filler particles of a size sufficiently small to create micropores when removed from said immobilized coating.

6. A method according to claim 4 wherein said method additionally comprises the step of removing the immobilized polymer coating from the substrate.

7. A method according to claim 4 wherein said substrate is a porous, flexible substrate.

8. A method according to claim 7 wherein said porous, flexible substrate is a non-woven web comprising polypropylene fibers.

9. A method according to claim 7 wherein said substrate is primed with a low viscosity polymer solution prior to applying the coating composition.

10. A method according to claim 9 wherein said low viscosity priming solution comprises a mixture of polyvinyl chloride polymer and polyurethane polymer in solvent.

11. A method according to claim 5 wherein said removable particles are water soluble particles.

12. A method according to claim 11 wherein said particles are sodium chloride particles.

13. A method according to claim 4 wherein said solvent in said coating composition comprises N,N-dimethylformamide.

14. A method according to claim 13 wherein said polymer coating is immobilized by contact with a liquid which is miscible with said polymer solvent and which is not a solvent for said polymer.

15. A method according to claim 14 wherein said liquid is water.

16. A method according to claim 4 wherein said polymer coating is immobilized by evaporation of said solvent from said coating.

* * * * *